United States Patent
Wang (10) Patent No.: US 9,445,401 B2
(45) Date of Patent: Sep. 13, 2016

(54) METHOD AND DEVICE FOR TRANSMITTING A CONTROL CHANNEL MAPPED TO ONE OR MORE CONTROL CHANNEL ELEMENTS

(71) Applicant: Huawei Device Co., Ltd., Shenzhen, Guangdong (CN)

(72) Inventor: Jian Wang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 136 days.

(21) Appl. No.: 14/087,913

(22) Filed: Nov. 22, 2013

(65) Prior Publication Data

US 2014/0078999 A1 Mar. 20, 2014

Related U.S. Application Data

(63) Continuation of application No. PCT/CN2012/079279, filed on Jul. 27, 2012.

(51) Int. Cl.
*H04W 72/04* (2009.01)
*H04L 5/00* (2006.01)

(52) U.S. Cl.
CPC ........ *H04W 72/0406* (2013.01); *H04L 5/0053* (2013.01); *H04L 5/0007* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2011/0268062 A1 | 11/2011 | Ji et al. | |
| 2012/0040704 A1 | 2/2012 | Kim et al. | |
| 2013/0039284 A1* | 2/2013 | Marinier | H04L 5/001 370/329 |

(Continued)

FOREIGN PATENT DOCUMENTS

| | | |
|---|---|---|
| CN | 102395206 A | 3/2012 |
| CN | 102420685 A | 4/2012 |

(Continued)

OTHER PUBLICATIONS

"Search spaces for ePDCCH," 3GPP TSG-RAN WG1 Meeting #68bis, Jeju, Republic of Korea, R1-121022, 3$^{rd}$ Generation Partnership Project, Valbonne, France (Mar. 26-30, 2012).

(Continued)

*Primary Examiner* — Yemane Mesfin
*Assistant Examiner* — Peter Chen
(74) *Attorney, Agent, or Firm* — Leydig, Voit & Mayer, Ltd.

(57) ABSTRACT

A method, an apparatus, and a device for transmitting a control channel are disclosed. The method includes: generating at least one eCCE, and transmitting the control channel through the at least one eCCE, where a process of generating each eCCE specifically includes: determining at least two physical resource block (PRB) pairs for transmitting the control channel, where each PRB pair of the at least two PRB pairs correspond to multiple enhanced resource element groups eREGs and the multiple eREGs have eREG attribute information that is not exactly the same; and selecting each eREG from the multiple eREGs corresponding to each PRB pair, where the selected eREGs have different eREG attribute information, and forming an eCCE with the selected eREGs. Embodiments of the present invention are applied to implement generation of an eCCE according to an eREG, so as to transmit an enhanced control channel through the eCCE.

9 Claims, 4 Drawing Sheets

(56) References Cited

U.S. PATENT DOCUMENTS

| | | | |
|---|---|---|---|
| 2013/0215842 A1* | 8/2013 | Han et al. | 370/329 |
| 2013/0223332 A1 | 8/2013 | Wu et al. | |
| 2013/0242890 A1* | 9/2013 | He et al. | 370/329 |
| 2013/0272214 A1* | 10/2013 | Zhu | H04W 28/02 370/329 |
| 2013/0301562 A1* | 11/2013 | Liao et al. | 370/329 |
| 2013/0308557 A1* | 11/2013 | Gao | H04W 72/0406 370/329 |
| 2014/0071934 A1* | 3/2014 | Frenne et al. | 370/330 |
| 2014/0328301 A1* | 11/2014 | Kim | H04L 5/0053 370/329 |
| 2015/0003349 A1* | 1/2015 | Kim | H04W 72/042 370/329 |
| 2015/0016386 A1* | 1/2015 | Tamrakar et al. | 370/329 |
| 2015/0131565 A1* | 5/2015 | Nakashima | H04L 1/0026 370/329 |
| 2015/0189640 A1* | 7/2015 | Lee | H04L 5/0053 370/329 |

FOREIGN PATENT DOCUMENTS

| | | |
|---|---|---|
| CN | 102469589 A | 5/2012 |
| CN | 102612094 A | 7/2012 |

OTHER PUBLICATIONS

"Details of multiplexing of DCI messages," 3GPP TSG-RAN WG1 Meeting #68bis, Jeju, Republic of Korea, R1-121023, 3$^{rd}$ Generation Partnership Project, Valbonne, France (Mar. 26-30, 2012).

"On ePDCCH Multiplexing," 3GPP TSG RAN WG1 Meeting #68bis, Jeju, Republic of Korea, R1-121319, 3$^{rd}$ Generation Partnership Project, Valbonne, France (Mar. 26-30, 2012).

"UE-specific Search Space Design for Enhanced Downlink Control Channel," 3GPP TSG-RAN WG1 Meeting #69, Prague, Czech Republic, R1-122069, 3$^{rd}$ Generation Partnership Project, Valbonne, France (May 21-25, 2012).

"Views on Resource Mapping for ePDCCH," 3GPP TSG RAN WG1 Meeting #69, Prague, Czech Republic, R1-121977, 3$^{rd}$ Generation Partnership Project, Valbonne, France (May 21-25, 2012).

* cited by examiner

| eCCE number | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PRB number | 0 | 0 | 0 | 0 | 0 | 0 | 0 | 0 | 0 | 0 | 0 | 0 | 0 | 0 | 0 | 0 |
| Port number | A | B | C | D | A | B | C | D | A | B | C | D | A | B | C | D |
| Location number | 0 | 1 | 2 | 3 | 1 | 2 | 3 | 0 | 2 | 3 | 0 | 1 | 3 | 0 | 1 | 2 |
| PRB number | 1 | 1 | 1 | 1 | 1 | 1 | 1 | 1 | 1 | 1 | 1 | 1 | 1 | 1 | 1 | 1 |
| Port number | B | C | D | A | B | C | D | A | B | C | D | A | B | C | D | A |
| Location number | 1 | 2 | 3 | 0 | 2 | 3 | 0 | 1 | 3 | 0 | 1 | 2 | 0 | 1 | 2 | 3 |
| PRB number | 2 | 2 | 2 | 2 | 2 | 2 | 2 | 2 | 2 | 2 | 2 | 2 | 2 | 2 | 2 | 2 |
| Port number | C | D | A | B | C | D | A | B | C | D | A | B | C | D | A | B |
| Location number | 2 | 3 | 0 | 1 | 3 | 0 | 1 | 2 | 0 | 1 | 2 | 3 | 1 | 2 | 3 | 0 |
| PRB number | 3 | 3 | 3 | 3 | 3 | 3 | 3 | 3 | 3 | 3 | 3 | 3 | 3 | 3 | 3 | 3 |
| Port number | D | A | B | C | D | A | B | C | D | A | B | C | D | A | B | C |
| Location number | 3 | 0 | 1 | 2 | 0 | 1 | 2 | 3 | 1 | 2 | 3 | 0 | 2 | 3 | 0 | 1 |

METHOD AND DEVICE FOR TRANSMITTING A CONTROL CHANNEL MAPPED TO ONE OR MORE CONTROL CHANNEL ELEMENTS

CROSS-REFERENCE TO RELATED APPLICATIONS

This application is a continuation of International Patent Application No. PCT/CN2012/079279, filed on Jul. 27, 2012, which is hereby incorporated by reference in its entirety.

TECHNICAL FIELD

The present invention relates to the field of communications technologies, and in particular to a method and a device for transmitting a control channel.

BACKGROUND

In a wireless communications system such as a long term evolution (Long Term Evolution, LTE) system or a long term evolution advanced (Long Term Evolution Advanced, LTE-Advanced) system, a downlink multiple access mode generally is an orthogonal frequency division multiple access (Orthogonal Frequency Division Multiple Access, OFDMA) mode. Downlink resources of a system are divided into a plurality of orthogonal frequency division multiplexing (Orthogonal Frequency Division Multiplexing, OFDM) symbols from the perspective of time. The downlink resources of the system are also divided into a plurality of subcarriers from the perspective of frequency. In the LTE system, a complete physical downlink control channel (Physical Downlink Control Channel, PDCCH) may be mapped to one or several control channel elements (Control Channel Element, CCE). According to LTE Release 8/9/10, a PDCCH may be mapped to 1 (one), 2 (two), 4 (four), or 8 (eight) CCEs, that is, a PDCCH is formed from the 1, 2, 4, or 8 CCEs, which respectively corresponds to an aggregation level 1, 2, 4, or 8 of the PDCCH. Furthermore, each CCE is formed from 9 (nine) resource element groups (Resource Element Group, REG), and a REG occupies 4 (four) resource elements (Resource Element, RE).

In the LTE or LTE-Advanced system, a physical downlink control channel (Physical Downlink Control Channel, PDCCH) transmitted based on a manner of precoding is introduced, that is, an enhanced physical downlink control channel (Enhanced Physical Downlink Control Channel, ePDCCH). The ePDCCH allows that a user equipment (User Equipment, UE) is capable of carrying out demodulation based on specific reference signals, that is, the demodulation reference signals (Demodulation Reference Signal, DMRS). The ePDCCH is transmitted in a region for transmitting a downlink data channel in a subframe, and frequency division can be performed for it and a physical downlink shared channel (Physical Downlink Shared Channel, PDSCH). A base station may send the ePDCCH on a unit physical resource block (Physical Resource Block, PRB) with a good channel condition according to a channel status reported by a terminal. REs forming each PRB can be divided into multiple enhanced resource element groups (Enhanced Resource Element Group, eREG), and each eREG includes a specified number of REs.

In the conventional art, although the ePDCCH is introduced and a manner of generating an eREG on a PRB is provided, a manner of generating an enhanced control channel element (Enhanced Control Channel Element, eCCE) according to an eREG so as to transmit an enhanced control channel such as an ePDCCH through the eCCE is blank in the conventional art.

SUMMARY

Embodiments of the present invention provide a method, an apparatus, and a device for transmitting a control channel, so as to implement generation of an eCCE according to an eREG, thereby transmitting an enhanced control channel through the eCCE.

To solve the technical problem described above, the embodiments of the present invention disclose the following technical solutions:

In one aspect of the present invention, a method for transmitting a control channel is provided, where the method includes:

generating at least one enhanced control channel element eCCE; and transmitting the control channel through the at least one eCCE; where:

a process of generating each eCCE specifically includes:

determining at least two physical resource block PRB pairs for transmitting the control channel, where each PRB pair of the at least two PRB pairs is corresponding to multiple enhanced resource element groups eREGs and the multiple eREGs have eREG attribute information that is not exactly the same; and selecting an eREG from the multiple eREGs corresponding to each PRB pair, where the selected eREGs have different eREG attribute information, and forming an eCCE with the selected eREGs.

In combination with the one aspect, in a first possible implementation manner, each eREG among the multiple eREGs includes a specified number of resource elements REs, resource elements REs included in each PRB pair are divided according to the specified number to obtain multiple groups, and each group is corresponding to an eREG.

In combination with the one aspect or the first possible implementation manner, in a second possible implementation manner, the eREG attribute information includes resource location information, and that the selected eREGs have different eREG attribute information refers to that the selected eREGs have different resource location information; or the eREG attribute information includes resource port number information, and that the selected eREGs have different eREG attribute information refers to that the selected eREGs have different resource port number information; or the eREG attribute information includes resource location information and resource port number information, and that the selected eREGs have different eREG attribute information refers to that the selected eREGs have different resource location information, or that the selected eREGs have different resource port number information, or that the selected eREGs have different resource location information and resource port number information.

In combination with the second possible implementation manner, in a third possible implementation manner, the eREG attribute information further includes the number of punches of an RE; and that the selected eREGs have different eREG attribute information further includes that the selected eREGs have different numbers of punches.

In combination with the one aspect, the first possible implementation manner, the second possible implementation manner, or the third possible implementation manner, the method further includes:

selecting at least two eCCEs from the generated eCCEs, where among eREGs of the at least two eCCEs, eREGs belonging to a same PRB pair have different resource port number information; and the transmitting the control channel through the at least one eCCE is specifically: transmitting the control channel through the selected at least two eCCEs.

In another aspect of the present invention, an apparatus for transmitting a control channel is provided, where the apparatus includes:

a generation unit, configured to generate at least one enhanced control channel element eCCE; and a transmission unit, configured to transmit the control channel through the at least one eCCE generated by the generation unit; where:

the generation unit is specifically configured to determine at least two physical resource block PRB pairs for transmitting the control channel when each eCCE is generated, where each PRB pair of the at least two PRB pairs is corresponding to multiple enhanced resource element groups eREGs and the multiple eREGs have eREG attribute information that is not exactly the same; and select an eREG from the multiple eREGs corresponding to each PRB pair, where the selected eREGs have different eREG attribute information, and form an eCCE with the selected eREGs.

In combination with the another aspect, in a first possible implementation manner, each eREG among the multiple eREGs includes a specified number of resource elements REs, resource elements REs included in each PRB pair are divided according to the specified number to obtain multiple groups, and each group is corresponding to an eREG.

In combination with the another aspect or the first possible implementation manner, in a second possible implementation manner, the eREG attribute information includes resource location information, and that the selected eREGs have different eREG attribute information refers to that the selected eREGs have different resource location information; or the eREG attribute information includes resource port number information, and that the selected eREGs have different eREG attribute information refers to that the selected eREGs have different resource port number information; or the eREG attribute information includes resource location information and resource port number information, and that the selected eREGs have different eREG attribute information refers to that the selected eREGs have different resource location information, or that the selected eREGs have different resource port number information, or that the selected eREGs have different resource location information and resource port number information.

In combination with the second possible implementation manner, in a third possible implementation manner, the eREG attribute information further includes the number of punches of an RE; and that the selected eREGs have different eREG attribute information further includes that the selected eREGs have different numbers of punches.

In combination with the another aspect, the first possible implementation manner, the second possible implementation manner, or the third possible implementation manner, the apparatus further includes:

a selection unit, configured to select at least two eCCEs from the eCCEs generated by the generation unit, where among eREGs of the at least two eCCEs, eREGs belonging to a same PRB pair have different resource port number information; and the transmission unit is specifically configured to transmit the control channel through the at least two eCCEs selected by the selection unit.

In still another aspect of the present invention, a device for transmitting a control channel is provided, where the device includes:

a processor, configured to generate at least one enhanced control channel element eCCE; and a transmitter, configured to transmit the control channel through the at least one eCCE generated by the processor; where:

the processor is specifically configured to determine at least two physical resource block PRB pairs for transmitting the control channel when each eCCE is generated, where each PRB pair of the at least two PRB pairs is corresponding to multiple enhanced resource element groups eREGs and the multiple eREGs have eREG attribute information that is not exactly the same; and select an eREG from the multiple eREGs corresponding to each PRB pair, where the selected eREGs have different eREG attribute information, and form an eCCE with the selected eREGs.

In combination with the still another aspect, in a first possible implementation manner, each eREG among the multiple eREGs includes a specified number of resource elements REs, resource elements REs included in each PRB pair are divided according to the specified number to obtain multiple groups, and each group is corresponding to an eREG.

In combination with the still another aspect or the first possible implementation manner, in a second possible implementation manner, the eREG attribute information includes resource location information, and that the selected eREGs have different eREG attribute information refers to that the selected eREGs have different resource location information; or the eREG attribute information includes resource port number information, and that the selected eREGs have different eREG attribute information refers to that the selected eREGs have different resource port number information; or the eREG attribute information includes resource location information and resource port number information, and that the selected eREGs have different eREG attribute information refers to that the selected eREGs have different resource location information, or that the selected eREGs have different resource port number information, or that the selected eREGs have different resource location information and resource port number information.

In combination with the second possible implementation manner, in a third possible implementation manner, the eREG attribute information further includes the number of punches of an RE; and that the selected eREGs have different eREG attribute information further includes that the selected eREGs have different numbers of punches.

In combination with the still another aspect, the first possible implementation manner, the second possible implementation manner, or the third possible implementation manner, the processor is further configured to select at least two eCCEs from the generated eCCEs, where among eREGs of the at least two eCCEs, eREGs belonging to a same PRB pair have different resource port number information; and the transmitter is specifically configured to transmit the control channel through the at least two eCCEs selected by the processor.

In the embodiments of the present invention, at least one eCCE is generated and a control channel is transmitted through the at least one eCCE; when each eCCE is generated, at least two PRB pairs for transmitting the control channel are determined, where each PRB pair of the at least two PRB pairs corresponds to multiple eREGs and the multiple eREGs have eREG attribute information that is not exactly the same; each eREG is selected from the multiple eREGs corresponding to each PRB pair, where the selected eREGs have different eREG attribute information; and an eCCE is formed from the selected eREGs. The embodiments of the present invention are applied to implement generation of an eCCE according to an eREG, so as to transmit an enhanced control channel through the eCCE; because the eREGs of the eCCE for transmitting the enhanced control channel have different eREG attribute information, a feature of full frequency diversity of the eCCE is ensured when these eREGs belong to different PRBs, a feature of full space diversity of the eCCE is ensured when these eREGs belong to different resource ports, and robust performance of the eCCE is ensured when resource locations of RE resources included in these eREGs are different.

BRIEF DESCRIPTION OF DRAWINGS

To illustrate the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from the accompanying drawings without creative efforts.

DESCRIPTION OF EMBODIMENTS

The following embodiments of the present invention provide a method, an apparatus, and a device for transmitting a control channel.

In order to make persons skill in the technical field better under the technical solutions in the embodiments of the present invention, and make the objects, features, and advantages of the embodiments of the present invention easier to understand, the following further describes the technical solutions in the embodiments of the present invention in detail with reference to the accompanying drawings.

In a wireless communications system such as a long term evolution (Long Term Evolution, LTE) system or a long term evolution advanced (Long Term Evolution Advanced, LTE-Advanced) system, a downlink multiple access mode generally uses an orthogonal frequency division multiple access (Orthogonal Frequency Division Multiple Access, OFDMA) mode. Downlink resources of a system are divided into a plurality of orthogonal frequency division multiplexing (Orthogonal Frequency Division Multiple, OFDM) symbols from the perspective of time, and are divided into a plurality of subcarriers from the perspective of frequency.

According to a standard of Release 8, 9 or 10 released by the LTE (LTE Release 8/9/10), a normal downlink subframe contains two slots, each slot has 7 (seven) or 6 (six) OFDM symbols, and therefore a normal downlink subframe contains 14 (fourteen) or 12 (twelve) OFDM symbols totally. The LTE Release 8/9/10 standard also defines a size of a resource block (Resource Block, RB), a resource block includes 12 subcarriers in a frequency domain and has a half time length of a subframe (i.e., a slot) in a time domain, that is, the resource block (RE) includes 7 or 6 OFDM symbols. On a subframe, a pair of resource blocks of two slots is called a resource block pair (RB pair). During an actual sending process, a resource block pair used by a physical resource is also called a physical resource block pair (Physical RB pair, PRB pair), which is generally called a unit physical resource block. Therefore, the PRB pair described in the embodiments of the present invention may be also called a PRB pair, a physical resource block, a unit physical resource block, or a physical resource block pair.

Various data borne on a subframe is organized to be mapped by dividing various physical channels on the physical time frequency resources of the subframe. The various physical channels are approximately classified into the following two categories: (1) control channels and (2) traffic channels Correspondingly, the data borne on a control channel may be called control data (which may generally be called control information), and data borne on a traffic channel may be called traffic data (which may generally be called data). A fundamental purpose of sending a subframe is to transmit the traffic data, and a function of the control channel is to assist in the transmission of the traffic data.

In the LTE system, a complete physical downlink control channel (Physical Downlink Control Channel, PDCCH) may be mapped to one or several control channel elements (Control Channel Element, CCE). According to the LTE Release 8/9/10, a PDCCH may be mapped to 1, 2, 4, or 8 CCEs, that is, a PDCCH is formed from the 1, 2, 4, or 8 CCEs, which respectively corresponds to an aggregation level 1, 2, 4, or 8 of the PDCCH.

Due to the introduction of technologies such as multi-user multiple input multiple output (Multiple Input Multiple Output, MIMO) and coordinated multiple points (Coordinated Multiple Points, CoMP), a physical downlink control channel (Physical Downlink Control Channel, PDCCH) transmitted based on a manner of precoding, that is, an enhanced physical downlink control channel (Enhanced Physical Downlink Control Channel, ePDCCH), is introduced, and the ePDCCH multiplexes part of the resources of a physical downlink shared channel (Physical Downlink Shared Channel, PDSCH). The ePDCCH allows that a user equipment (User Equipment, UE), like the PDSCH, is capable of carrying out demodulation based on specific reference signals, that is, demodulation reference signals (Demodulation Reference Signal, DMRS). Control information described in subsequent embodiments of the present invention mainly refers to the ePDCCH; each ePDCCH may still be mapped to a number of k logical units such as the CCE (which is defined as an eCCE in the embodiments of the present invention), and at a terminal side, the UE may perform blind detection on eCCEs corresponding to different aggregation levels. Refer to definitions of the aggregation levels in the PDCCH. An aggregation level of an ePDCCH may also be defined as L (L=1, 2, 4, or 8 or the like). ePDCCHs corresponding to different aggregation levels may be mapped to a number of L eCCEs. That is, the L eCCEs form an ePDCCH, where each eCCE is formed from at least one eREG.

Figure 1A:
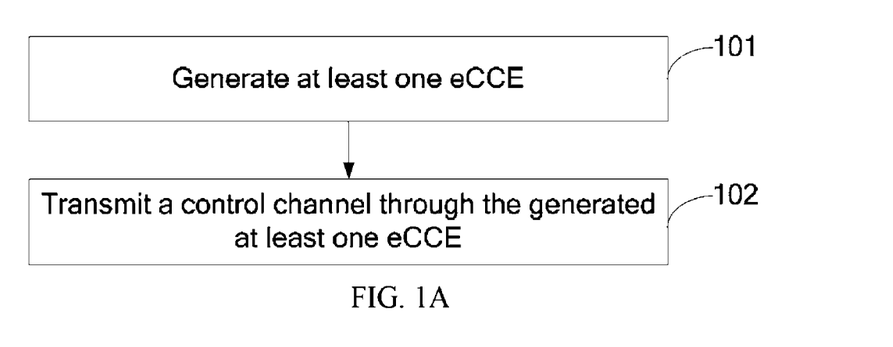
FIG. 1A is a flow chart of an embodiment of a method for transmitting a control channel according to the present invention.

Refer to FIG. 1A, which is a flow chart of an embodiment of a method for transmitting a control channel according to the present invention.

Step 101: Generating at least one eCCE.

Specifically, at least two PRB pairs for transmitting the control channel are determined when each eCCE is generated, where each PRB pair of the at least two PRB pairs corresponds to multiple eREGs and the multiple eREGs have eREG attribute information that is not exactly the same; each eREG is selected from the multiple eREGs corresponding to each PRB pair, where the selected eREGs have different eREG attribute information; and an eCCE is formed from the selected eREGs. That the multiple eREGs have eREG attribute information that is not exactly the same may refer to that any two eREGs among the multiple eREGs have partially different attribute information or completely different attribute information. Preferably, the selected eREGs have completely different eREG attribute information.

Alternatively, each eREG among the multiple eREGs includes a specified number of resource elements REs, resource elements (Res) included in each PRB pair are divided according to the specified number to obtain multiple groups, and each group corresponds to an eREG. Alternatively, in a possible implementation manner of this embodiment, the REs in each PRB pair that are used to divide the eREGs may include all the REs of each PRB pair, or the REs in each PRB pair that are used to divide the eREGs may include other optional REs among all the REs of each PRB pair except a resource element to which reference signals and/or another control channel is mapped. The reference signals may include but are not limited to at least one of the following: common reference signals (Common Reference Signal, CRS), DMRSs, channel status information reference signals (Channel Status Information Reference Signal, CSI-RS), and positioning reference signals (Positioning Reference Signal, PRS). The another control channel may be specifically at least one of a physical downlink control channel (Physical Downlink Control Channel, PDCCH), a physical control format indicator channel (Physical Control Format Indicator Channel, PCFICH), and a physical hybrid ARQ indicator channel (Physical Hybrid ARQ Indicator Channel, PHICH). The eREG attribute information includes at least one piece of the following information: resource location information and resource port number information of RE resources included in the eREG.

Alternatively, the eREG attribute information includes resource location information, and that the selected eREGs have different eREG attribute information refers to that the selected eREGs have different resource location information; or the eREG attribute information includes resource port number information, and that the selected eREGs have different eREG attribute information refers to that the selected eREGs have different resource port number information; or the eREG attribute information includes resource location information and resource port number information, and that the selected eREGs have different eREG attribute information refers to that the selected eREGs have different resource location information, or that the selected eREGs have different resource port number information, or that the selected eREGs have different resource location information and resource port number information.

Alternatively, the eREG attribute information may further include the number of punches of an RE, and that the selected eREGs have different eREG attribute information may further include that the selected eREGs have different numbers of punches.

Figure 1B:
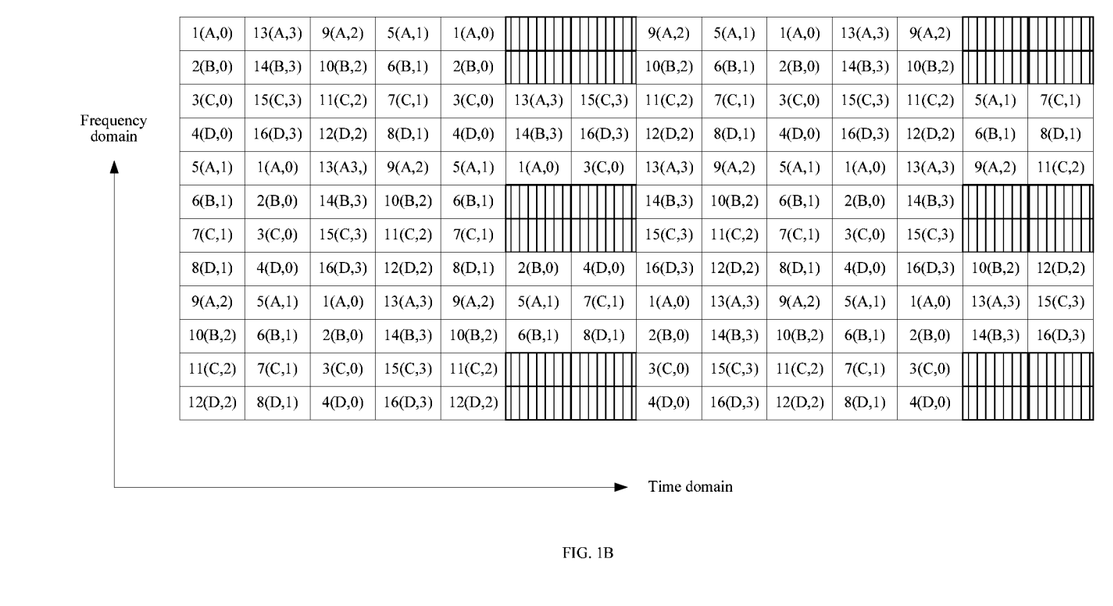
FIG. 1B is a schematic diagram of a PRB pair according to an embodiment of the present invention.

Refer to FIG. 1B, which is a schematic diagram of a PRB pair according to an embodiment of the present invention. The PRB pair includes 168 (one hundred and sixty-eight) REs, includes 12 (twelve) subcarriers in a frequency domain, and includes 14 (fourteen) OFDM symbols in a time domain. Each small box represents an RE, and a shadow with vertical lines indicates an RE to which DMRSs are mapped. In this embodiment, REs used to divide the eREGs are on the PRB pair except the RE to which the DMRSs are mapped, that is, 144 (one hundred and forty-four) REs totally are on the PRB pair.

In FIG. 1B, 144 REs except the REs to which the DMRSs are mapped are divided into 16 (sixteen) eREGs, and each eREG includes 9 (nine) REs, where each RE has corresponding port number information and resource location information. That is, an information formation manner of an RE represented by each small box in FIG. 1B is X (Y, Z), where X indicates a number of an eREG, Y indicates port number information, and Z indicates resource location information; the REs included in a same eREG have the same port number information and resource location information, and different eREGs have port number information and resource location information that are not exactly the same. For example, an eREG whose number is 1 and an eREG whose number is 2 have different port number information (e.g., A and B, respectively) and the same resource location information (e.g., 0 (zero) for the both). For another example, the eREG whose number is 1 and an eREG whose number is 6 have different port number information (e.g., A and B) and different resource location information (e.g., 0 and 1, respectively).

In combination with FIG. 1B, when it is determined in step 101 that totally four PRB pairs for transmitting the control channel exist, each PRB pair among the four PRB pairs correspondingly includes 16 (sixteen) eREGs shown in FIG. 1B.

Still in combination with FIG. 1B, it is assumed four PRB pairs exist, which are PRB pair 0 (PRB0), PRB pair 1 (PRB1), PRB pair 2 (PRB2), and PRB pair 3 (PRB3). When each eREG is selected from each of the four PRB pairs to form an eCCE, preferably, the selected eREGs have completely different port number information and resource location information. For example, eREGs forming an eCCE include: an eREG which is selected from the PRB0 and whose number is 12 (marked as PRB0, port number D, and location 2), an eREG which is selected from the PRB1 and whose number is 13 (marked as PRB1, port number A, and location 3), an eREG which is selected from the PRB2 and whose number is 2 (marked as PRB2, port number B, and location 0), and an eREG which is selected from the PRB3 and whose number is 7 (marked as PRB3, port number C, and location 1). It can be seen that the eREGs forming the eCCE have completely different attribute information; that is, the eREGs belong to different PRBs, have different port numbers, and have different locations. The example described above is an example in which the four eREGs are selected from the four PRBs to form an eCCE. Similar to a selection manner of the example described above, eREGs with different attribute information may be also selected from the four PRB to generate several different eCCEs, and details are not repeated herein.

Furthermore, the former n (n is a number of 1, 2, or 3) OFDM symbols on a PRB are generally used for transmitting an existing PDCCH. Therefore, when REs forming an eREG overlap in location with REs reserved for the PDCCH, the REs belonging to the PDCCH need to be removed from the REs of the eREG. The number of the REs which are located at different resource locations and need to be removed from the REs reserved for the PDCCH is the number of punches of the eREG. For example, it is assumed that the former three OFDM symbols on each PRB pair are reserved for the PDCCH; for the four eREGs forming an eCCE in the above example, in the eREG whose number is 12 in the PRB0, the total number of REs which need to be removed from the former three OFDM symbols in the PRB0 is 2; in the eREG whose number is 13 in the PRB1, the total number of REs which need to be removed from the former three OFDM symbols in the PRB1 is 2; in the eREG whose number is 2 in the PRB2, the total number of REs which need to be removed from the former three OFDM symbols in the PRB2 is 3; and in the eREG whose number is 7 in the PRB3, the total number of REs which need to be removed from the former three OFDM symbols in the PRB3 is 2. It can be learned that, the four eREGs forming an eCCE have the numbers of punches that are not exactly the same (which may be marked as 2, 2, 3, and 2), and totally 9 (nine) REs are removed from the punched eCCE, so that it can be ensured that the eREGs included in different eCCEs have the same RE length after being punched. For example, if the number of punches of another eCCE is (2, 3, 2, and 2), 9 REs are also removed from the eCCE equivalently.

It should be noted that, FIG. 1B merely shows an example in which a PRB pair includes eREGs, that is, the PRB pair includes 16 (sixteen) eREGs, and each eREG includes 9 (nine) REs. In an actual practice, the PRB pair may also include a different number of eREGs, for example, the PRB pair includes 8 (eight) eREGs and each eREG includes 18 (eighteen) Res, etc, which is not limited in this embodiment of the present invention.

Step 102: Transmitting the control channel through the at least one generated eCCE.

The control channel that is determined to be transmitted in this embodiment of the present invention mainly refers to an ePDCCH. Multiple eCCEs may be generated according to Step 101. When the control channel is transmitted, according to the aggregation level of the control channel, the control channel may be transmitted through 1 (one), 2 (two), 4 (four), or 8 (eight) eCCEs. Correspondingly, a UE needs to perform blind detection on the eCCEs for transmitting the control channel As can be seen from the above embodiment, this embodiment implements the generation of an eCCE according to an eREG, so as to transmit an enhanced control channel through the eCCE; according to the above mapping manner, a feature of a full frequency diversity of an eCCE is ensured when the eREGs forming the eCCE belong to different PRBs, a feature of a full space diversity of an eCCE is ensured when eREGs forming the eCCE belong to different resource ports, and the robust performance of an eCCE is ensured when resource locations of RE resources included in the eREGs forming the eCCE are different.

Figure 2A:
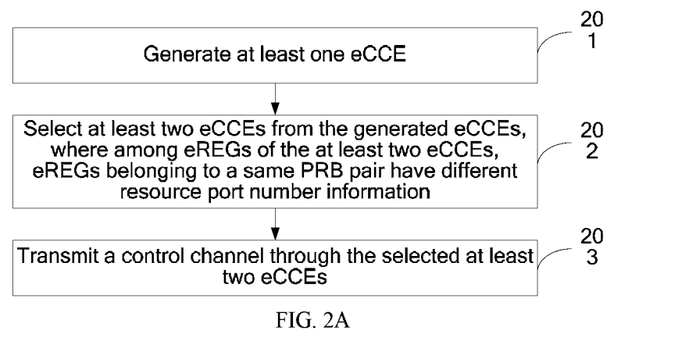
FIG. 2A is a flow chart of another embodiment of a method for transmitting a control channel according to the present invention.

Refer to FIG. 2A, which is a flow chart of another embodiment of a method for transmitting a control channel according to the present invention.

Step 201: Generating at least one eCCE.

Specifically, at least two PRB pairs for transmitting the control channel are determined when each eCCE is generated, where each PRB pair of the at least two PRB pairs corresponds to multiple eREGs and the multiple eREGs have eREG attribute information that is not exactly the same; each eREG is selected from the multiple eREGs corresponding to each PRB pair, where the selected eREGs have different eREG attribute information; and an eCCE is formed from the selected eREGs. That the multiple eREGs have eREG attribute information that is not exactly the same may refer to that any two eREGs among the multiple eREGs have partially different attribute information or completely different attribute information. Preferably, the selected eREGs have completely different eREG attribute information.

Alternatively, each eREG among the multiple eREGs includes a specified number of resource elements (REs), resource elements (REs) included in each PRB pair are divided according to the specified number to obtain multiple groups, and each group corresponds to an eREG. Alternatively, in a possible implementation manner of this embodiment, the REs in each PRB pair that are used to divide the eREGs may include all the REs of each PRB pair, or the REs in each PRB pair that are used to divide the eREGs may include other optional REs among all the REs of each PRB pair except a resource element to which reference signals and/or another control channel is mapped.

Alternatively, the eREG attribute information includes resource location information, and that the selected eREGs have different eREG attribute information refers to that the selected eREGs have different resource location information; or the eREG attribute information includes the resource port number information, and that the selected eREGs have different eREG attribute information refers to that the selected eREGs have different resource port number information; or the eREG attribute information includes the resource location information and resource port number information, and that the selected eREGs have different eREG attribute information refers to that the selected eREGs have different resource location information, or that the selected eREGs have different resource port number information, or that the selected eREGs have different resource location information and resource port number information.

Alternatively, the eREG attribute information may further include the number of punches of an RE, and that the selected eREGs have different eREG attribute information may further include that the selected eREGs have different numbers of punches.

In this embodiment, a process of selecting an eREG from each PRB pair to form an eCCE is consistent with the description in the embodiment shown in FIG. 1, and therefore details are not repeated herein.

Step 202: Selecting at least two eCCEs from the generated eCCEs, where among eREGs of the at least two eCCEs, eREGs belonging to a same PRB pair have different resource port number information.

In this embodiment, when an aggregation level of the control channel is higher than 1, for example, when the aggregation level is 2, two eCCEs are required to transmit the control channel FIG. 1B is still taken as an example. It is assumed that two eCCEs are marked as eCCE0 and eCCE1, respectively; it is assumed that the four eREGs forming eCCE0 include (PRB0, port number D, and location 2), (PRB1, port number A, and location 3), (PRB2, port number B, and location 0), and (PRB3, port number C, and location 1), and four eREGs forming the eCCE1 include (PRB0, port number A, and location 0), (PRB1, port number B, and location 1), (PRB2, port number C, and location 2), and (PRB3, port number D, and location 3). Among the eREGs forming eCCE0 and the eREGs forming eCCE1, part of the eREGs belong to a same PRB pair. For example, both the eREG (PRB0, port number D, and location 2) of eCCE0 and the eREG (PRB0, port number A, and location 0) of eCCE1 belong to PRB0. It is required that the eREGs of different eCCEs have different port numbers, where the eREGs belong to the same PRB pair, so as to ensure that the same PRB at the aggregation level has good space diversity. For example, although both the eREG (PRB0, port number D, and location 2) of eCCE0 and the eREG (PRB0, port number A, and location 0) of eCCE1 belong to PRB0, the eREGs have different port numbers, which are D and A.

Figure 2B:
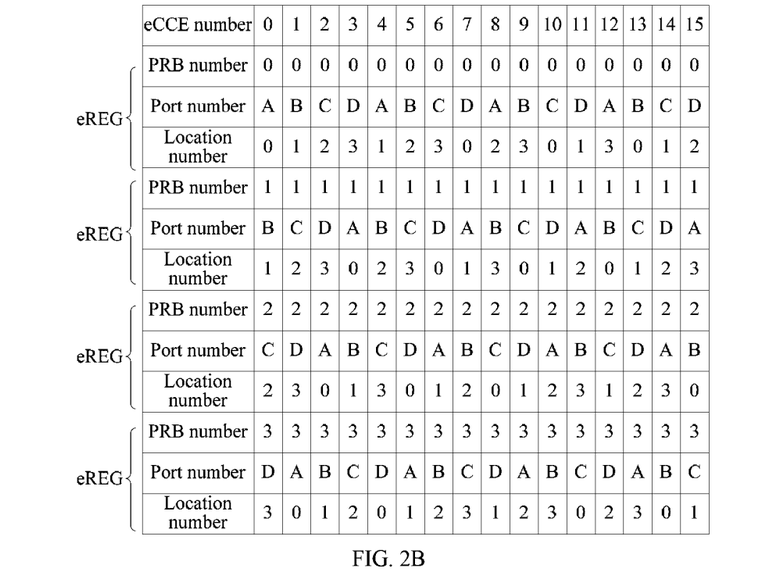
FIG. 2B is a schematic diagram of a manner of numbering eCCEs according to an embodiment of the present invention.

To satisfy that the eREGs in different eCCEs have different port numbers, where the eREGs belong to the same PRB pair, a manner of numbering the eCCEs shown in FIG. 2B can be used. In FIG. 2B, each column represents an eCCE. It can be learned from FIG. 2B that when at least two neighboring eCCEs are selected from FIG. 2B according to the aggregation level (the maximum aggregation level is 4 in FIG. 2B), the eREGs in any neighboring eCCEs have different port numbers, where the eREGs belong to a same PRB pair.

Step 203: Transmitting the control channel through the selected at least two eCCEs.

The control channel that is determined to be transmitted in this embodiment of the present invention mainly refers to an ePDCCH.

The method embodiment is applied to implement generation of an eCCE according to an eREG, so as to transmit an enhanced control channel through the eCCE; because the eREGs of the eCCE for transmitting the enhanced control channel have different eREG attribute information, a feature of a full frequency diversity of the eCCE is ensured when these eREGs belong to different PRBs, a feature of the full space diversity of the eCCE is ensured when these eREGs belong to different resource ports, and robust performance of the eCCE is ensured when resource locations of RE resources included in these eREGs are different.

It should be noted that, for brevity, the foregoing method embodiments are represented as a series of actions. However, persons skilled in the art should understand that the present application is not limited to the order of the described actions, because according to the present invention, some steps may adopt other order or occur simultaneously. It should be further understood by persons skilled in the art that the described embodiments all belong to exemplary embodiments, and the involved actions and modules are not necessarily required by the present application.

In the foregoing embodiments, the description of each of the embodiments has different focuses. For a part that is not described in detail in a certain embodiment, reference may be made to relevant descriptions in other embodiments.

Figure 3:
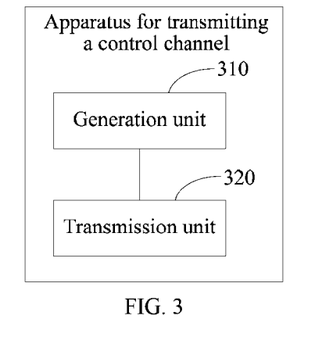
FIG. 3 is a block diagram of an embodiment of an apparatus for transmitting a control channel according to the present invention.

Corresponding to the embodiment of the method for transmitting a control channel according to the present invention, the present invention further provides an embodiment of an apparatus for transmitting a control channel and an embodiment of a device for transmitting a control channel Refer to FIG. 3, which is a block diagram of an embodiment of an apparatus for transmitting a control channel according to the present invention.

The apparatus includes: a generation unit 310 and a transmission unit 320, where:

the generation unit 310 is configured to generate at least one enhanced control channel element (eCCE);

the transmission unit 320 is configured to transmit the control channel through the at least one eCCE generated by the generation unit 310; and the generation unit 310 is specifically configured to determine at least two physical resource block (PRB) pairs for transmitting the control channel when each eCCE is generated, where each PRB pair of the at least two PRB pairs corresponds to multiple enhanced resource element groups (eREGs) and the multiple eREGs have eREG attribute information that is not exactly the same; and select an eREG from the multiple eREGs corresponding to each PRB pair, where the selected eREGs have different eREG attribute information, and form an eCCE with the selected eREGs.

Alternatively, each eREG among the multiple eREGs includes a specified number of resource elements (REs), resource elements (REs) included in each PRB pair are divided according to the specified number to obtain multiple groups, and each group corresponds to an eREG.

Alternatively, the eREG attribute information includes resource location information, and that the selected eREGs have different eREG attribute information refers to that the selected eREGs have different resource location information; or the eREG attribute information includes resource port number information, and that the selected eREGs have different eREG attribute information refers to that the selected eREGs have different resource port number information; or the eREG attribute information includes resource location information and resource port number information, and that the selected eREGs have different eREG attribute information refers to that the selected eREGs have different resource location information, or that the selected eREGs have different resource port number information, or that the selected eREGs have different resource location information and resource port number information.

Alternatively, the eREG attribute information may further include the number of punches of an RE, and that the selected eREGs have different eREG attribute information may further include that the selected eREGs have different numbers of punches.

Figure 4:
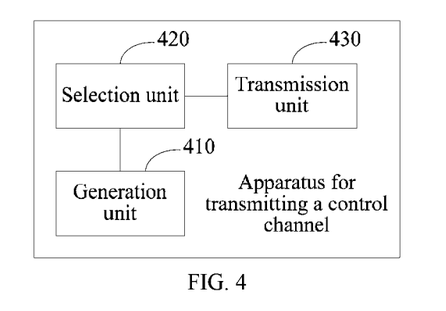
FIG. 4 is a block diagram of another embodiment of an apparatus for transmitting a control channel according to the present invention.

Refer to FIG. 4, which is a block diagram of an embodiment of an apparatus for transmitting a control channel according to the present invention.

The apparatus includes: a generation unit 410, a selection unit 420, and a transmission unit 430, where:

the generation unit 410 is configured to generate at least one enhanced control channel element (eCCE);

the selection unit 420 is configured to select at least two eCCEs from the eCCEs generated by the generation unit 410, where among eREGs of the at least two eCCEs, eREGs belonging to a same PRB pair have different resource port number information; and the transmission unit 430 is configured to transmit the control channel through the at least two eCCEs selected by the selection unit 420.

The generation unit 310 is specifically configured to determine at least two physical resource block PRB pairs for transmitting the control channel when each eCCE is generated, where each PRB pair of the at least two PRB pairs is corresponding to multiple enhanced resource element groups eREGs and the multiple eREGs have eREG attribute information that is not exactly the same; and select an eREG from the multiple eREGs corresponding to each PRB pair, where the selected eREGs have different eREG attribute information, and form an eCCE with the selected eREGs.

Alternatively, each eREG among the multiple eREGs includes a specified number of resource elements (REs), resource elements (REs) included in each PRB pair are divided according to the specified number to obtain multiple groups, and each group corresponds to an eREG.

Alternatively, the eREG attribute information includes resource location information, and that the selected eREGs have different eREG attribute information refers to that the selected eREGs have different resource location information; or the eREG attribute information includes resource port number information, and that the selected eREGs have different eREG attribute information refers to that the selected eREGs have different resource port number information; or the eREG attribute information includes resource location information and resource port number information, and that the selected eREGs have different eREG attribute information refers to that the selected eREGs have different resource location information, or that the selected eREGs have different resource port number information, or that the selected eREGs have different resource location information and resource port number information.

Alternatively, the eREG attribute information may further include the number of punches of an RE, and that the selected eREGs have different eREG attribute information may further include that the selected eREGs have different numbers of punches.

Figure 5:
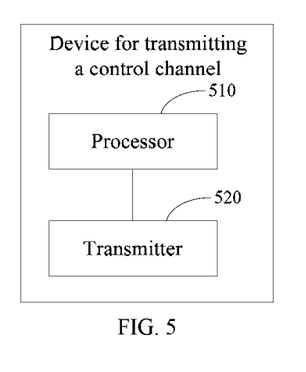
FIG. 5 is a block diagram of an embodiment of a device for transmitting a control channel according to the present invention.

Refer to FIG. 5, which is a block diagram of an embodiment of a device for transmitting a control channel according to the present invention.

The device includes: a processor 510 and a transmitter 520, where:

the processor 510 is configured to generate at least one enhanced control channel element eCCE; and the transmitter 520 is configured to transmit the control channel through the at least one eCCE generated by the processor 510.

The processor 510 is specifically configured to determine at least two physical resource block PRB pairs for transmitting the control channel when each eCCE is generated, where each PRB pair of the at least two PRB pairs corresponds to multiple enhanced resource element groups eREGs and the multiple eREGs have eREG attribute information that is not exactly the same; and select each eREG from the multiple eREGs corresponding to each PRB pair, where the selected eREGs have different eREG attribute information, and form an eCCE with the selected eREGs.

Alternatively, each eREG among the multiple eREGs includes a specified number of resource elements (REs), resource elements (REs) included in each PRB pair are divided according to the specified number to obtain multiple groups, and each group corresponds to an eREG.

Alternatively, the eREG attribute information includes resource location information, and that the selected eREGs have different eREG attribute information refers to that the selected eREGs have different resource location information; or the eREG attribute information includes resource port number information, and that the selected eREGs have different eREG attribute information refers to that the selected eREGs have different resource port number information; or the eREG attribute information includes resource location information and resource port number information, and that the selected eREGs have different eREG attribute information refers to that the selected eREGs have different resource location information, or that the selected eREGs have different resource port number information, or that the selected eREGs have different resource location information and resource port number information.

Alternatively, the eREG attribute information may further include the number of punches of an RE, and that the selected eREGs have different eREG attribute information may further include that the selected eREGs have different numbers of punches.

As can be seen from the above embodiment, in this embodiment of the present invention, at least one eCCE is generated and a control channel is transmitted through the at least one eCCE; when each eCCE is generated, at least two PRB pairs for transmitting the control channel are determined, where each PRB pair of the at least two PRB pairs is corresponding to multiple eREGs and the multiple eREGs have eREG attribute information that is not exactly the same; each eREG is selected from the multiple eREGs corresponding to each PRB pair, where the selected eREGs have different eREG attribute information; and an eCCE is formed from the selected eREGs. This embodiment of the present invention is applied to implement the generation of an eCCE according to an eREG, so as to transmit an enhanced control channel through the eCCE; because the eREGs of the eCCE for transmitting the enhanced control channel have different eREG attribute information, a feature of full frequency diversity of the eCCE is ensured when these eREGs belong to different PRBs, a feature of full space diversity of the eCCE is ensured when these eREGs belong to different resource ports, and robust performance of the eCCE is ensured when resource locations of RE resources included in these eREGs are different.

The term "and/or" in the embodiments of the present invention indicates only an association between associated objects, and represents that three relationships may exist, for example, A and/or B may represent the three cases: Only A exists, both A and B exist, and only B exists. In addition, the character "/" in this document generally represents that the former and latter associated objects are in an "or" relationship.

Persons skilled in the art may clearly understand that technologies in the embodiments of the present invention may be implemented using software plus a necessary universal hardware platform. Based on such an understanding, the technical solutions in the embodiments of the present invention essentially or the part contributing to the prior art may be implemented in the form of a software product. The computer software product may be stored in a storage medium such as a ROM/RAM, a magnetic disk, or an optical disk, and include several instructions for instructing a computer device (which may be a personal computer, a server, or a network device) to perform the methods described in the embodiments of the present invention or in some parts of the embodiments.

The embodiments in the specification are described in a progressive manner, and reference may be made between the same or similar parts of the embodiments. Every embodiment illustrates in emphasis what is different from the other embodiments. In particular, for the system embodiment, since it is basically similar to the method embodiments, the system embodiment is described simply, and for related parts, reference may be made to a part of the descriptions of the method embodiments.

The above implementation manners of the present invention do not constitute a limitation to the protection scope of the present invention. Any modification, equivalent replacement, and improvement made within the principle of the present invention should fall within the protection scope of the present invention.

What is claimed is:

1. A method for transmitting a control channel, comprising:
generating at least one enhanced control channel element (eCCE);
transmitting the control channel through the at least one eCCE, wherein generating each eCCE comprises:
determining four physical resource block (PRB) pairs, wherein each PRB pair of the four PRB pairs comprises sixteen enhanced resource element groups (eREGs) twelve subcarriers in a frequency domain and fourteen Orthogonal Frequency Division Multiple (OFDM) symbols in a time domain;
144 resource elements (REs), comprising all REs except REs to which Demodulation Reference Signals (DMRSs) are mapped, are divided into sixteen eREGs, with each eREG comprising nine REs;
information of each RE comprises X and Z, where X indicates a number of eREGs, Z indicates resource location information and Z is 0, 1, 2, or 3;
the 144 REs are numbered, using the X, cyclically from the first integer of sixteen consecutive integers to the last integer of sixteen consecutive integers in an increasing order of frequency first and then time;
in a case where the X is equal to the first integer of the sixteen consecutive integers, the second integer of the sixteen consecutive integers, the third integer of the sixteen consecutive integers or the forth integer of the sixteen consecutive integers, the Z is equal to 0;
in a case where the X is equal to the fifth integer of the sixteen consecutive integers, the sixth integer of the sixteen consecutive integers, the seventh integer of the sixteen consecutive integers or the eighth integer of the sixteen consecutive integers, the Z is equal to 1;
in a case where the X is equal to the ninth integer of the sixteen consecutive integers, the tenth integer of the sixteen consecutive integers, the eleventh integer of the sixteen consecutive integers or the twelfth integer of the sixteen consecutive integers, the Z is equal to 2;
in a case where the X is equal to the thirteenth integer of the sixteen consecutive integers, the fourteenth integer of the sixteen consecutive integers, the fifteenth integer of the sixteen consecutive integers or the last integer of the sixteen consecutive integers, the Z is equal to 3;
selecting four eREGs from the four PRB pairs respectively, wherein the resource location information of four selected eREGs are different from each other; and
generating one eCCE of the at least one eCCE with the four selected eREGs.

2. The method according to claim 1, wherein the four selected eREGs have different numbers of punches.

3. The method according to claim 1, wherein before transmitting the control channel through the at least one eCCE, the method further comprises:
selecting at least two eCCEs from the generated at least one eCCE, wherein among eREGs of the at least two eCCEs, eREGs belonging to a same PRB pair have different resource port number information; and
wherein the transmitting the control channel through the at least one eCCE comprises transmitting the control channel through the selected at least two eCCEs.

4. A device for transmitting a control channel, comprising:
a processor configured to generate at least one enhanced control channel element (eCCE); and
a transmitter coupled to the processor and configured to transmit the control channel through the at least one eCCE generated by the processor, wherein the processor is configured to:
determine four physical resource block (PRB) pairs, wherein each PRB pair of the four PRB pairs comprises sixteen enhanced resource element groups (eREGs), twelve subcarriers in a frequency domain and fourteen Orthogonal Frequency Division Multiple (OFDM) symbols in a time domain;
144 resource elements (REs), comprising all REs except REs to which Demodulation Reference Signals (DMRSs) are mapped, are divided into the sixteen eREGs, with each eREG comprising nine REs;
information of each RE comprises X and Z, where X indicates a number of an eREG, Z indicates resource location information and Z is 0, 1, 2, or 3;
the 144 REs are numbered, using the X, cyclically from the first integer of sixteen consecutive integers to the last integer of sixteen consecutive integers in an increasing order of first frequency and then time;
in a case where the X is equal to the first integer of the sixteen consecutive integers, the second integer of the sixteen consecutive integers, the third integer of the sixteen consecutive integers or the forth integer of the sixteen consecutive integers, the Z is equal to 0;
in a case where the X is equal to the fifth integer of the sixteen consecutive integers, the sixth integer of the sixteen consecutive integers, the seventh integer of the sixteen consecutive integers or the eighth integer of the sixteen consecutive integers, the Z is equal to 1;
in a case where the X is equal to the ninth integer of the sixteen consecutive integers, the tenth integer of the sixteen consecutive integers, the eleventh integer of the sixteen consecutive integers or the twelfth integer of the sixteen consecutive integers, the Z is equal to 2;
in a case where the X is equal to the thirteenth integer of the sixteen consecutive integers, the fourteenth integer of the sixteen consecutive integers, the fifteenth integer of the sixteen consecutive integers or the last integer of the sixteen consecutive integers, the Z is equal to 3;
select four eREGs from the four PRB pairs respectively to form an eCCE, wherein the resource location information of four selected eREGs are different from each other; and
generate one eCCE of the at least one eCCE with the four selected eREGs.

5. The device according to claim 4, wherein the four selected eREGs have different numbers of punches.

6. The device according to claim 4, wherein the processor is further configured to select at least two eCCEs from the generated at least one eCCE, wherein among eREGs of the at least two eCCEs, eREGs belonging to a same PRB pair have different resource port number information; and
the transmitter is specifically configured to transmit the control channel through the selected at least two eCCEs.

7. A non-transitory computer readable medium comprising processor-executable instructions, which when executed causes a processor to implement the following for transmitting a control channel:

generating at least one enhanced control channel element (eCCE);

transmitting the control channel through the at least one eCCE, wherein generating each eCCE comprises:

determining four physical resource block (PRB) pairs, wherein each PRB pair of the four PRB pairs comprises sixteen enhanced resource element groups (eREGs), twelve subcarriers in a frequency domain and fourteen Orthogonal Frequency Division Multiple (OFDM) symbols in a time domain;

144 resource elements (REs), comprising all REs except REs to which Demodulation Reference Signals (DMRSs) are mapped, are divided into sixteen eREGs, with each eREG comprising nine REs;

information of each RE comprises X and Z, where X indicates a number of eREGs, Z indicates resource location information and Z is 0, 1, 2, or 3;

the 144 REs are numbered, using the X, cyclically from the first integer of sixteen consecutive integers to the last integer of sixteen consecutive integers in an increasing order of frequency first and then time;

in a case where the X is equal to the first integer of the sixteen consecutive integers, the second integer of the sixteen consecutive integers, the third integer of the sixteen consecutive integers or the forth integer of the sixteen consecutive integers, the Z is equal to 0;

in a case where the X is equal to the fifth integer of the sixteen consecutive integers, the sixth integer of the sixteen consecutive integers, the seventh integer of the sixteen consecutive integers or the eighth integer of the sixteen consecutive integers, the Z is equal to 1;

in a case where the X is equal to the ninth integer of the sixteen consecutive integers, the tenth integer of the sixteen consecutive integers, the eleventh integer of the sixteen consecutive integers or the twelfth integer of the sixteen consecutive integers, the Z is equal to 2;

in a case where the X is equal to the thirteenth integer of the sixteen consecutive integers, the fourteenth integer of the sixteen consecutive integers, the fifteenth integer of the sixteen consecutive integers or the last integer of the sixteen consecutive integers, the Z is equal to 3;

selecting four eREGs from the four PRB pairs respectively, wherein the resource location information of four selected eREGs are different from each other; and generating one eCCE of the at least one eCCE with the four selected eREGs.

8. The non-transitory computer readable medium according to claim 7, wherein before transmitting the control channel through the at least one eCCE, the instructions further causes the processor to implement:

selecting at least two eCCEs from the generated at least one eCCE, wherein among eREGs of the at least two eCCEs, eREGs belonging to a same PRB pair have different resource port number information; and wherein the transmitting the control channel through the at least one eCCE comprises transmitting the control channel through the selected at least two eCCEs.

9. The non-transitory computer readable medium according to claim 7, wherein the four selected eREGs have different numbers of punches.

* * * * *